United States Patent
Kasten et al.

(10) Patent No.: US 10,400,574 B2
(45) Date of Patent: Sep. 3, 2019

(54) APPARATUS AND METHOD FOR INSPECTING INTEGRITY OF A MULTI-BARRIER WELLBORE

(71) Applicant: General Electric Company, Schenectady, NY (US)

(72) Inventors: Ansas Matthias Kasten, Niskayuna, NY (US); Juan Pablo Cilia, Delmar, NY (US); John Scott Price, Niskayuna, NY (US); William Robert Ross, Rotterdam, NY (US); Chengbao Wang, Oklahoma City, OK (US); Sudeep Mandal, Durham, NC (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 15/688,102

(22) Filed: Aug. 28, 2017

(65) Prior Publication Data
US 2019/0063208 A1  Feb. 28, 2019

(51) Int. Cl.
*E21B 47/00* (2012.01)
*G21K 1/02* (2006.01)
*G01V 5/12* (2006.01)

(52) U.S. Cl.
CPC ...... *E21B 47/0005* (2013.01); *E21B 47/0002* (2013.01); *E21B 47/0006* (2013.01); *G01V 5/125* (2013.01); *G21K 1/02* (2013.01)

(58) Field of Classification Search
CPC ............. E21B 47/0005; E21B 47/0002; E21B 47/0006; G01V 5/125; G21K 1/02
See application file for complete search history.

(56) References Cited

U.S. PATENT DOCUMENTS 5,451,779 A * 9/1995 Spross ............... G01V 5/12
                                                   250/254
6,815,665 B2  11/2004 Storm et al.
(Continued)

FOREIGN PATENT DOCUMENTS

WO   2016148696 A1   9/2016

OTHER PUBLICATIONS

Zeroug et al., "Sonic and Ultrasonic Measurement Applications for Cased Oil Wells", 19th World Conference on Non-Destructive Testing, 2016, pp. 1-12.

*Primary Examiner* — Marcus H Taningco
(74) *Attorney, Agent, or Firm* — Armstrong Teasdale LLP

(57) ABSTRACT

An apparatus for inspecting integrity of a multi-barrier wellbore is described. The apparatus includes at least one source to generate radiation to impinge a target volume of the wellbore. The apparatus includes a source collimator having a plurality of alternating blocking channels and passing channels to direct radiation to impinge the target volume, such that the radiation directed from each passing channel forms a plurality of field of views extending radially into the target volume. The apparatus further includes at least one detector to receive backscatter rays arising from each respective field of view from the plurality of field of views and to generate an image representative of an inspected portion of the wellbore. The apparatus is useful for inspecting very small volumes in the multiple barriers of the wellbore and determine the integrity of the wellbore based on the different densities in the image of the inspected portion.

17 Claims, 14 Drawing Sheets

(56) References Cited

U.S. PATENT DOCUMENTS

| | | |
|---|---|---|
| 8,138,471 B1 | 3/2012 | Shedlock et al. |
| 8,742,329 B2 | 6/2014 | Korkin et al. |
| 8,964,504 B2 | 2/2015 | Chace et al. |
| 9,182,081 B2 | 11/2015 | Ziegel et al. |
| 2015/0177409 A1 | 6/2015 | Sofiienko et al. |
| 2016/0061991 A1 | 3/2016 | Berkcan et al. |
| 2017/0218749 A1* | 8/2017 | Lee ................... E21B 47/0005 |
| 2018/0188411 A1* | 7/2018 | Teague ................... G01V 5/12 |

* cited by examiner

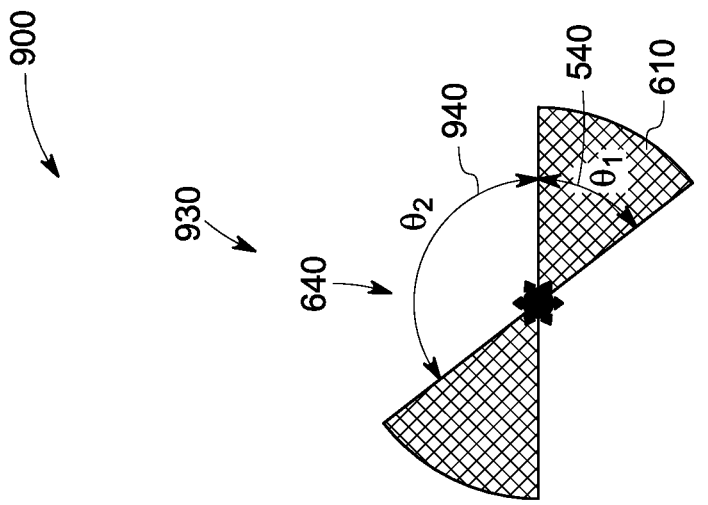
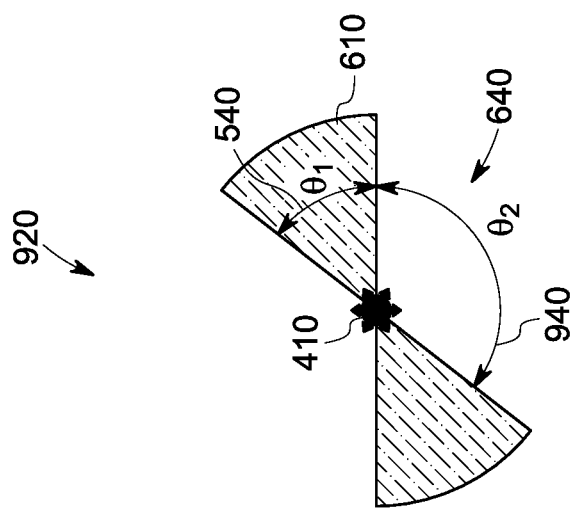
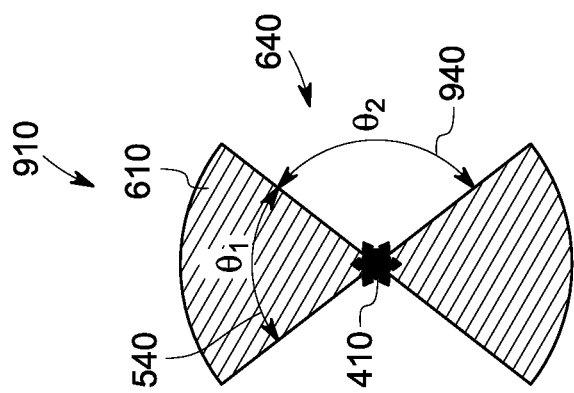
FIG. 9A  FIG. 9B  FIG. 9C
FIG. 9

APPARATUS AND METHOD FOR INSPECTING INTEGRITY OF A MULTI-BARRIER WELLBORE

STATEMENT REGARDING FEDERALLY SPONSORED RESEARCH AND DEVELOPMENT

This invention was made with Government support under contract number DE-FE0024293 awarded by the Department of Energy (DOE). The Government has certain rights in this invention.

BACKGROUND

This disclosure relates generally to hydrocarbon-producing wells, and more particularly to apparatus and methods for inspecting integrity of a multi-barrier well bore with respect to formation of defects in different material layers around the wellbore.

In hydrocarbon-producing wells such as oil and gas wells (including pipelines), it is important to ensure that there is no oil or gas leakage from the well into the surrounding rock formation. This is a critical safety requirement for the hydrocarbon-producing wells. The obvious consequences of blowouts or leaks include material damage, personnel injuries, loss of production and environmental damages, resulting in costly and risky repairs.

To ensure well safety, the wellbore is typically constructed with multiple layers, each layer includes a well casing made of metal, usually steel, surrounded by a cement wall, also referred herein as cement annuli. At shallow surface depths the number of layers are more. Some defects can occur during completion of a well construction, for example fluid channel defects are formed sometimes when cement is not replacing all mud/oil that is present in the well during well completion operation. Once the hydrocarbon-producing well has been commissioned for operation, the well integrity requires to be monitored, as defects like cracks, cement de-bonding etc. start occurring during an operational life of the hydrocarbon-producing well.

Some of the reasons for formation of these defects include, for example, a thermal expansion of cement during the initial process of formation of the cement wall, that expands the well casing, and subsequent cooling and contraction of cement during the setting process which leaves an annulus or micro-annulus i.e. a small air gap, at the steel-cement interface. Alternately, sometimes, during drilling, the hydrostatic pressure in the well casing reduces, leading to contraction of the well casing. This can result in creation of a defect in the casing cement interface. Further, an outer surface of the well casing may be covered by an oil film or a corrosion inhibitor which may not allow proper bonding with cement and a defect may be formed due to improper bonding. Moreover, cyclic pressure and temperature variations during hydrocarbon production also lead to the de-bonding of cement from the well casing. Other wellbore defects may include pitting/material loss of metal casings, fluid channel defects in the cement annuli (e.g. oil based mud defects), eccentricity of casings resulting in uneven cement distribution, etc.

It is important to monitor and detect these defects impacting the integrity of the wellbore, in order to ensure a safe operation of the well. Some of the techniques to detect these defects include use of acoustic waves in the ultrasound region that travel through the wellbore and casing-cement interfaces and are reflected back. The reflected waves are studied for their attenuation, amplitude, impedance, time of flight to determine the presence of annulus and the extent of penetration of the annulus into the cement wall.

The limitation of the ultrasound based technique being used is that, the oil and other well fluids, and cement signatures for attenuation are similar, and therefore it is difficult to accurately determine the presence of defects, or the extent of damage. Also, ultrasound wave of a particular frequency may not be able to pass through all the layers, thereby limiting its use when multiple layers are present between the transmitter and receiver. Further some of these techniques employ complex statistical signal processing, making it a complex procedure.

There are some other techniques that use X-rays and Gamma rays based reflections to detect the defects, but they face limitations related to space constraints of the wellbore, and it is a challenge to have the source and detector configurations that fit in an inspection tool that can traverse the wellbore in a high pressure and a high temperature environment and give reliable and discernable images from which defects can be detected.

BRIEF DESCRIPTION

In one aspect, an apparatus for inspecting integrity of a multi-barrier wellbore is described. The apparatus includes at least one source to generate radiation to impinge a target volume of the wellbore. The apparatus includes a source collimator having a plurality of alternating blocking channels and passing channels to direct radiation to impinge the target volume, such that the radiation directed from each passing channel forms a plurality of field of views extending radially into the target volume. The apparatus further includes at least one detector to receive backscatter rays arising from each respective field of view from the plurality of field of views and to generate an image representative of an inspected portion of the wellbore.

In another aspect, a method of inspecting a wellbore is described herein. The method includes a step for positioning the apparatus described herein above for inspecting the wellbore proximal to a target volume in the wellbore, and generating radiation from the at least one source to impinge the target volume of the wellbore through the plurality of field of views extending radially into the target volume. The method further includes a step for receiving backscatter rays from the plurality of field of views at the at least one detector. The method then includes a step for transmitting to a processor a signal representative of the backscatter rays; and a step for generating using the processor an image representative of the target volume of the wellbore.

DRAWINGS

These and other features, aspects, and advantages of the present disclosure will become better understood when the following detailed description is read with reference to the accompanying drawings in which like characters represent like parts throughout the drawings, wherein:

FIG. 9 is a diagrammatic view to explain an arrangement of multiple source collimators to scan a full circular portion of the wellbore around the source;

DETAILED DESCRIPTION

The foregoing description directed to particular embodiments described herein is for the purpose of illustration and explanation. It will be apparent, however, to one skilled in the art that many modifications and changes to the embodiments set forth above are possible without departing from the scope and the spirit of the disclosure. It is intended that the following claims be interpreted to embrace all such modifications and changes.

According to aspects of disclosure described herein, detection of defects in the multi-barrier wellbore, which include metal casing, cement, and the interface layers of casing-cement, and casing-bedrock as barriers, is important for determining well integrity of the wellbore in hydrocarbon wells. The apparatus and method for determining well integrity of the wellbore of a hydrocarbon-producing well described herein uses high energy radiation based (X-ray or alternately, Gamma ray) source-detector configurations to investigate very small volumes within the different barriers, in a manner that allows differentiating different densities of the probed volumes, and thereby determining with high accuracy any defects in any of the barrier layers or any of the interface layers between the barrier layers. In the description provided herein the defects are also referred to as well integrity parameters and include at least one of a void, a crack, a deformation, an annulus, a micro-annulus, or a cement de-bonding. For each of these parameters, well integrity features may be further determined that may include but are not limited to a presence or absence of defects, as well as length and thickness of defects including cement de-bonding.

Figure 1:
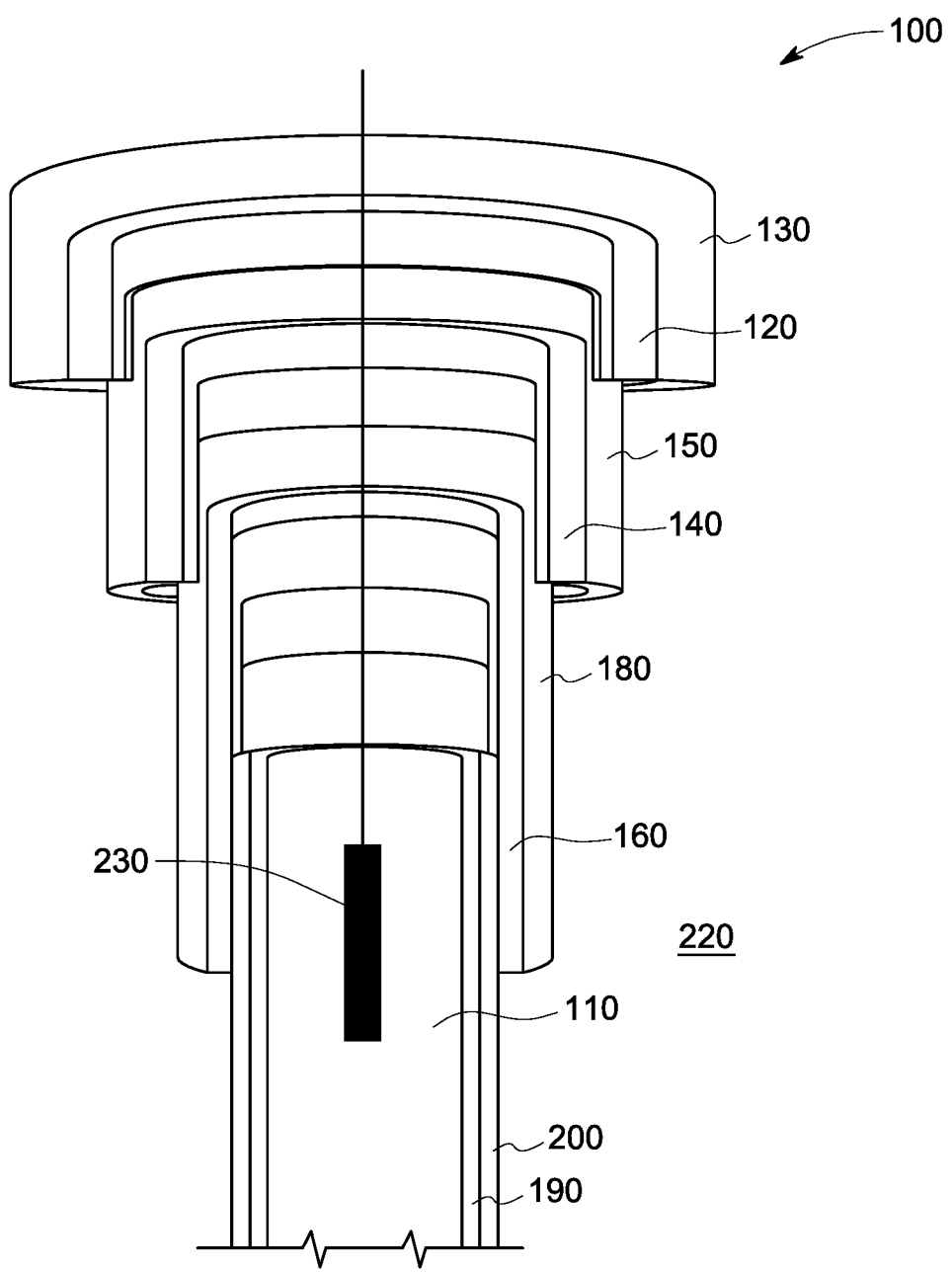
FIG. 1 is a diagrammatic representation of a hydrocarbon-producing well having a multi-barrier wellbore that is inspected using an inspection probe for defects, in accordance with different embodiments.

Now turning to FIG. 1, a diagrammatic representation of a hydrocarbon-producing well 100 drilled into the formation 220 is shown. The wellbore 110 has a series of cylindrical metal casing and cement wall layers 120, 130; 140, 150; 160, 180; and 190, 200. As is seen in FIG. 1, at shallow depths the numbers of layers are more and as the depth increases, the number of layers around the wellbore reduce, and at depths of about 1000-3000 meters, for example, the number of layers around the wellbore is typically one or two. In one example, the wellbore hole may have dimensions of about 80-360 mm, and may be filled with oil, gas, water or brine and have a temperature up to 180 degrees and a pressure of 15000-20000 psi. The steel casing 120 may be 8-36 mm thick and have a carbon content of 0.1-0.5%, and the cement wall 130 may have a thickness of 25-55 mm, for example.

The apparatus and method described herein are useful for the inspection of wellbore integrity at shallow surface depths where multiple casings and cement annuli are present and inspection through these multiple layers is a challenge. For on-shore wells, wellbore integrity around the ground water layer (depth of a few 1,000s feet) is very critical for environmental safety. For off-shore wells, inspection through the production tubing (through-tubing inspection) would make plug and abandonment of off-shore wells faster and cheaper. Verification of proper sealing and good integrity of off-shore wells before permanent abandonment is critical for oil operators when the wells reach the end of their lifetime. Aspects described herein are useful for inspection of both on-shore and off-shore wells. As shown in FIG. 1, an inspection probe 230 traverses into the wellbore 110 for determining well integrity of the hydrocarbon-producing well. The inspection probe 230 is deployed at the different depths inside the wellbore 110, and therefore has material and structural integrity to withstand the high pressures and high temperatures at these depths.

Figure 2:
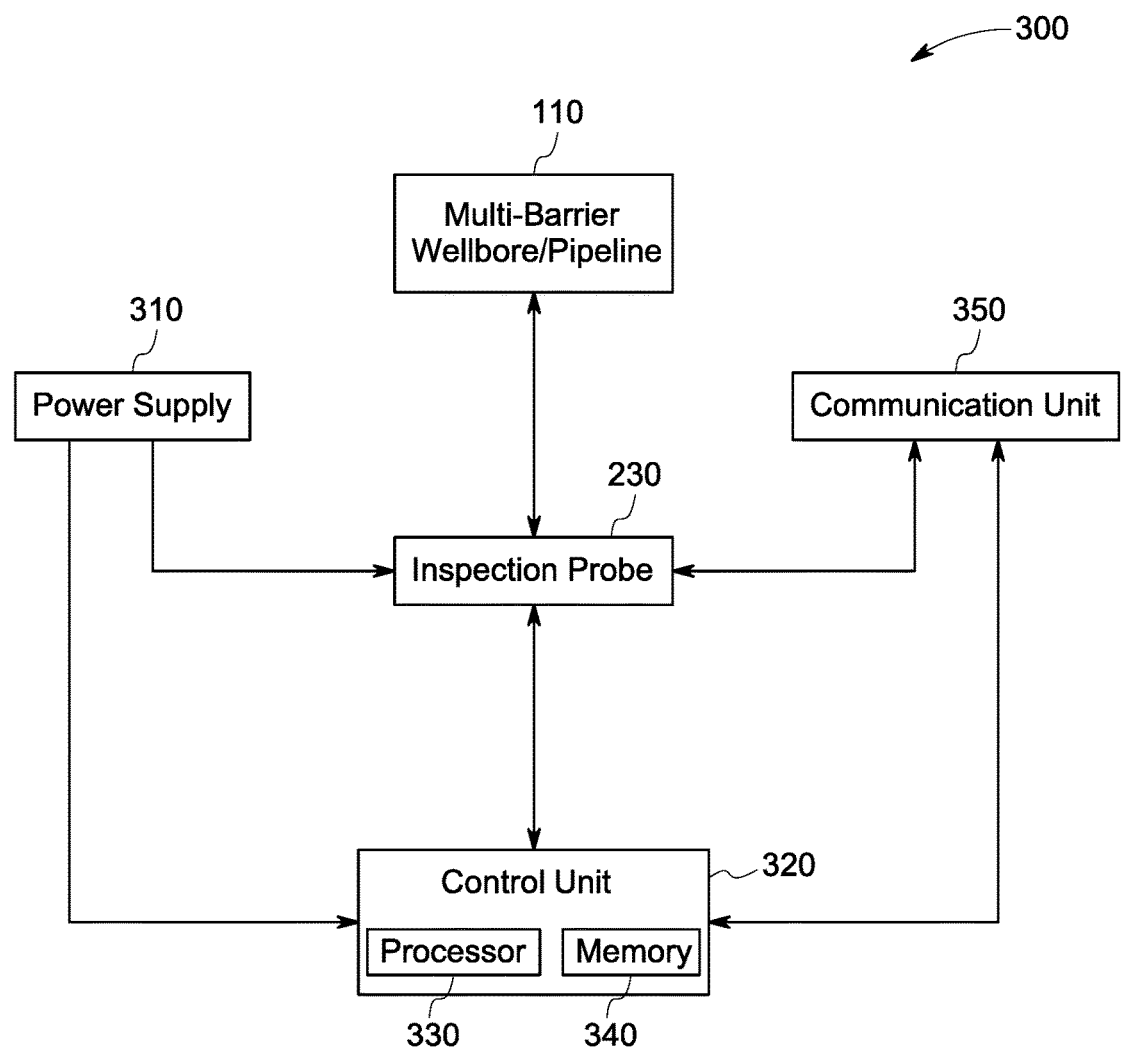
FIG. 2 is a block diagram representation of different components coupled to the inspection probe for enabling the inspection of the wellbore.

FIG. 2 is a block diagram representation 300 showing the inspection probe 230 coupled to components such as a power supply 310, a control unit 320 having a processor 330 and a memory 340 as non-transitory tangible components, and a communication unit 350 for enabling an operation of the inspection probe 230. The components, power supply 310, control unit 320, and the communication unit 350 may partly or fully reside within the inspection probe 230, or be a part of a surface unit, completely external to the inspection probe 230, and linked by wired or wireless connectivity as the inspection probe traverses the multi-barrier wellbore or pipeline 110.

The control unit 320 is used to provide user defined or sensor based inputs or pre-programmed control inputs to the inspection probe 230 to initiate the imaging process and receives signals from the inspection probe 230 that are indicative of completion of imaging or indicative of imaging in-process, or indicative of any fault in the inspection probe 230. The communication unit 350 provides an interface for communication between the inspection probe 230 and the control unit 320, and additionally may provide communication to another external device. The power supply 310 is used to power the inspection probe 230, control unit 320 and the communication unit 350, and includes batteries or other power sources. The inspection probe 230 includes an apparatus for inspecting the integrity of the wellbore having one or more radiation sources, collimators and detectors with useful imaging geometry and in different configurations, that are described in more detail in reference to the description herein below.

Figure 3:
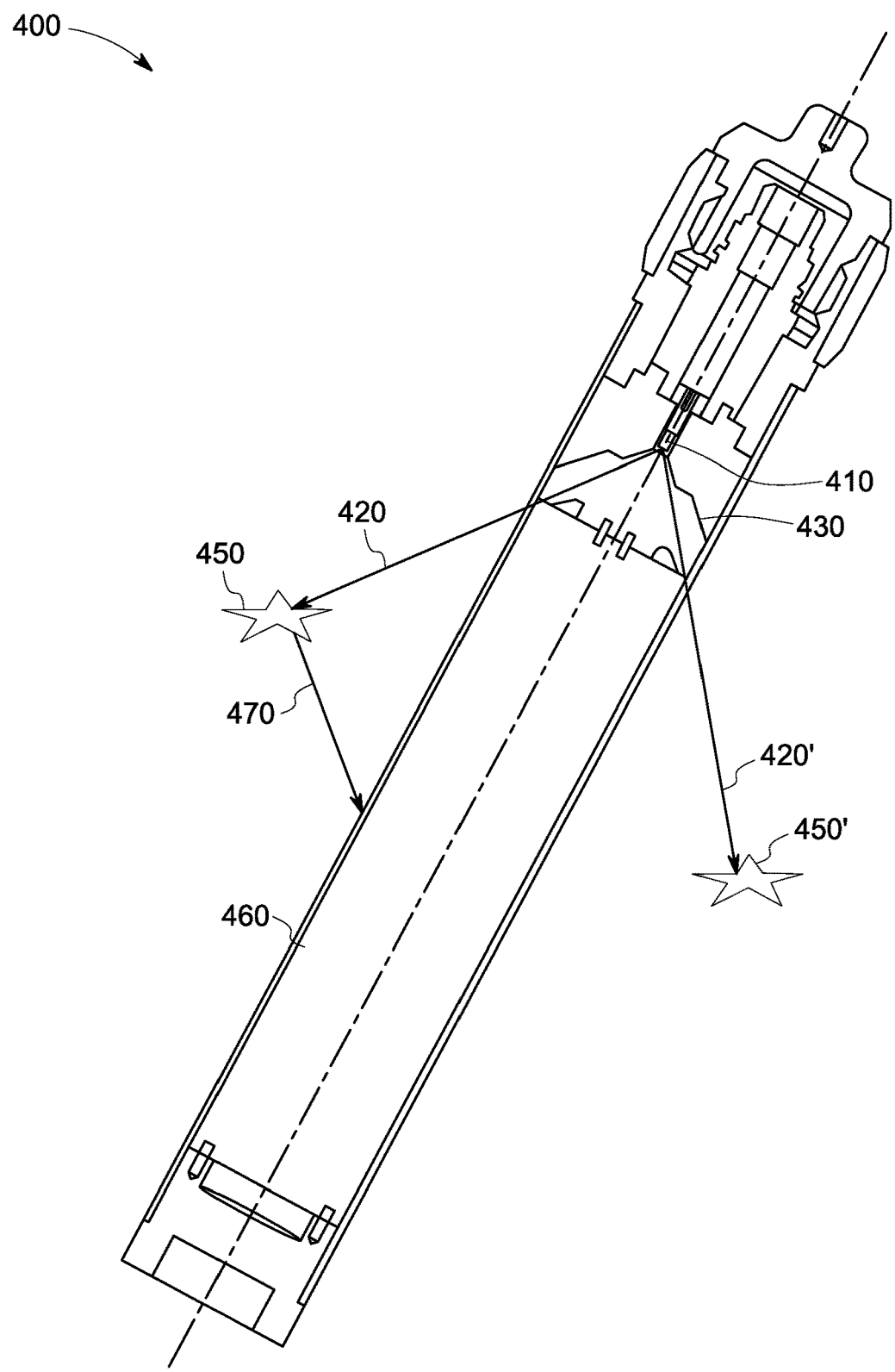
FIG. 3 is a diagrammatic representation of an apparatus for inspecting integrity of a multi-barrier wellbore positioned inside the inspection probe.

FIG. 3 is a diagrammatic representation of an apparatus 400 for inspecting integrity of a multi-barrier wellbore, where the apparatus 400 is positioned inside the inspection probe 230 described in FIG. 1 and FIG. 2. The apparatus 400 includes at least one source 410 to generate radiation 420, 420', that passes through the source collimator 430 to impinge a target volume 450, 450' that forms an inspected portion of the wellbore. A detector 460 receives backscattered rays 470 from the target volume 450 which causes the detector 460 to generate a signal representative of respective density of the inspected target volume 450. The processor 330 shown in FIG. 2 is configured to receive the signal representative of the backscattered rays from detector 460 described herein and configured to generate the image representative of the inspected portion of the wellbore, and further configured to determine one or more well integrity parameters based on density distribution in the image. The apparatus 400 in at least some embodiments traverses to different depths that may be user determined, (and may be pre-set through the control unit shown in FIG. 2) to capture different regions of the multi-barrier wellbore.

The image referred to herein is obtained by collating the backscattered rays from the entire inspected volume of the multi-barrier wellbore, the inspected volume being a part or a full circular region offset around the source in one scan. This ability to scan a circular volume around the source is very advantageous, as it allows smaller volumes to be investigated, allowing greater precision and reliability for capturing very small defects, and at the same time providing a larger circular cross-section to be imaged through the source collimator geometry that is described in more detail in FIG. 4.

Figure 4:
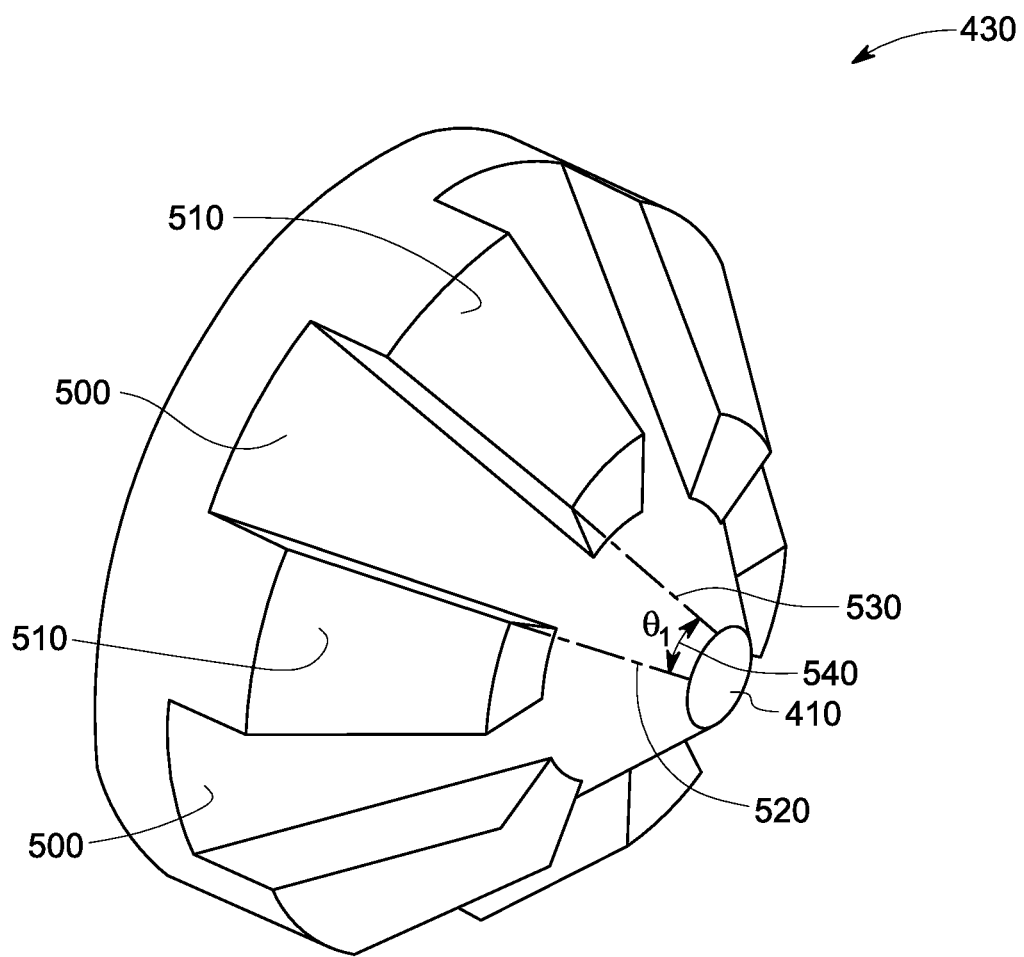
FIG. 4 is a diagrammatic representation of a source collimator used in the apparatus of FIG. 3.

FIG. 4 is a diagrammatic representation of the source collimator 430 having multiple alternating passing channels 500 and blocking channels 510 that allow inspection of multiple barriers in the path of radiation that radiates outwards through the passing channels, creating multiple field of views while impinging different barriers mentioned herein above. As is seen in FIG. 4, the edges 520 and 530 of the passing channel 500 form a first angle, an angle theta ($\theta_1$) 540 (seen with respect to source 410) that enables collimation of the radiation from the source to be spaced apart at the first angle, and therefore a span of coverage of the target volume is also defined by the first angle. In other words, each passing channel has an angular width defined by the first angle, which implies that the choice of the first angle allows for selecting the field of views that are suitable for capturing very small target volumes for each collimated radiation.

Moreover, since there are multiple passing channels, a known portion of the entire volume around the source is inspected in one scan, thus improving precision, speed and efficiency of imaging and inspecting the wellbore. Further, the source, collimator and detectors can be arranged in different configurations that also allow inspection of not only a select portion of the volume around the source but the entire volume around the source. Some of these embodiments are described hereinafter.

Figure 5:
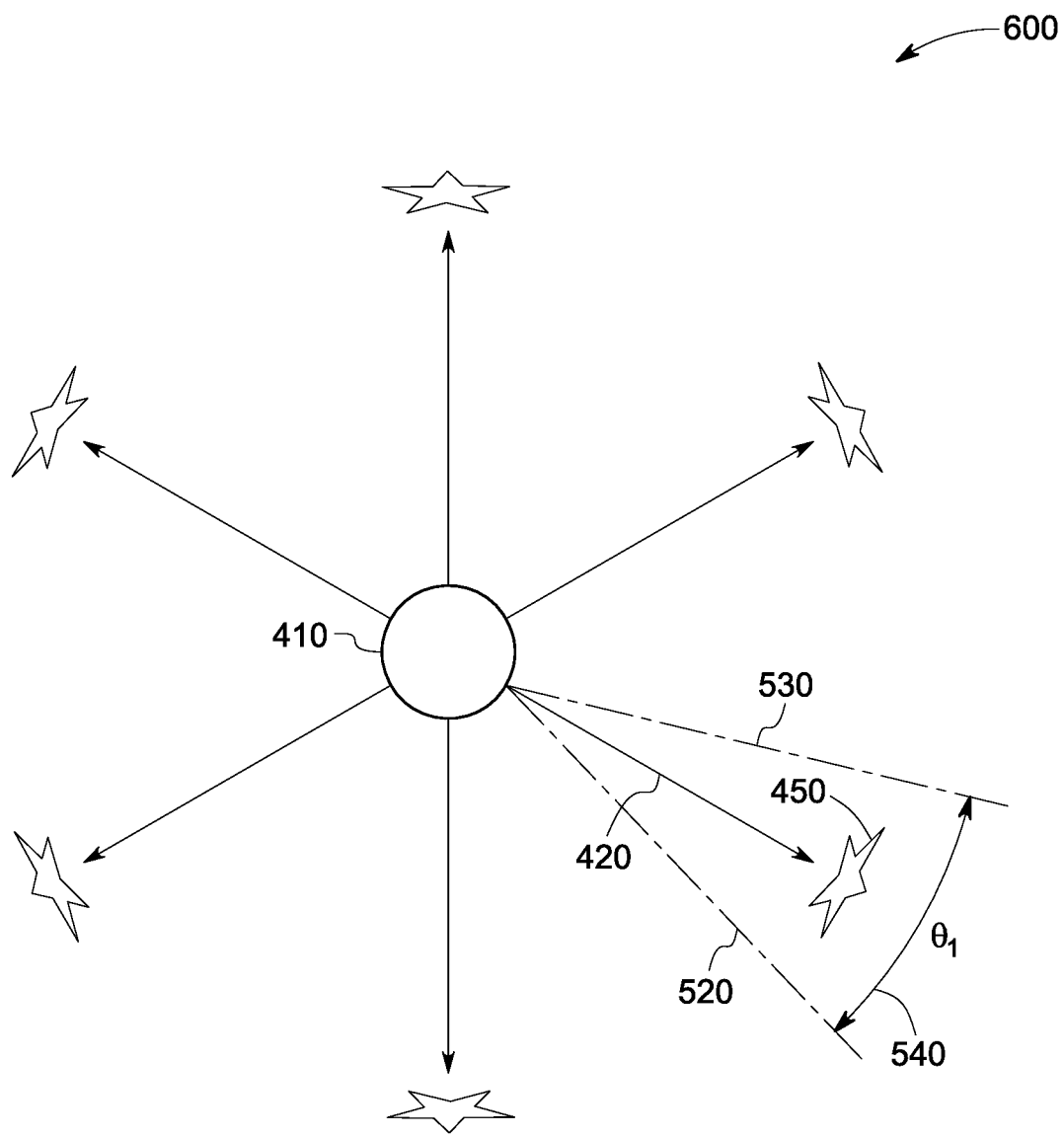
FIG. 5 is a diagrammatic representation showing the radiation projected from the source and directed through each passing channel of the source collimator of apparatus of FIG. 3.

FIG. 5 is a diagrammatic representation 600 that shows the radiation projections enabled by the source collimator 430 of FIG. 4. As explained herein above, the radiation is projected from the source 410 and directed through each passing channel (for example passing channel 500 of FIG. 4), and the radiation extends radially into the target volume 450. It may be noted here that though the collimated radiation is shown by individual rays, for example 420, the collimated radiation would have an angular span theta ($\theta_1$) 540 between the line segments 520 and 530.

It may be noted here that the radiation projections as shown in FIG. 5 enable generating of multiple collimator field of views that interrogate the different barriers in the multi-barrier wellbore. These collimator field of views are shown in FIG. 6.

Figure 6:
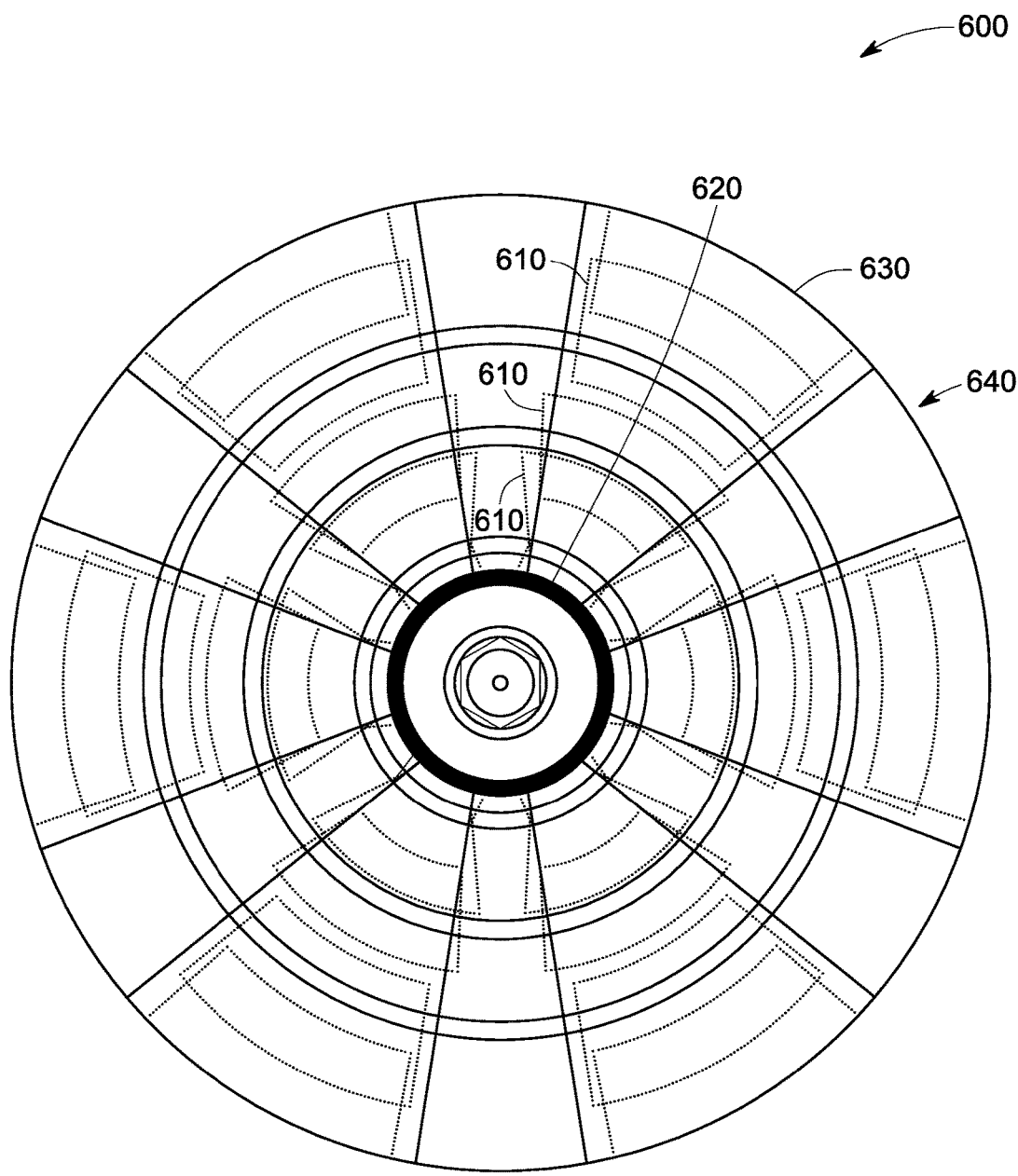
FIG. 6 is a diagrammatic representation showing different source collimator field of views that are generated using the source collimator of apparatus of FIG. 3.

FIG. 6 is a diagrammatic representation 600 that shows different collimator field of views 610 that are generated through a passing channel 500 as shown in FIG. 4 and impinge the different barriers around the wellbore in a radial direction through the field of views covering an entire section, starting from the source collimator (shown in FIG. 4) starting from a circumference 620 up to the last barrier shown by the circumference 630. In this manner, a precise known portion of the entire target volume of the different barriers around the source collimator is inspected by directing radiation through different passing channels (for example passing channel 500 in FIG. 4) of the source collimator. Also shown in FIG. 5 are the blank spaces 640 that are created due to the blocking channels 510 shown in FIG. 4.

It may be noted here that the source collimator geometry described herein above enables different configuration of apparatus 400 (FIG. 3) that can seamlessly and simultaneously achieve a 360-degree coverage of the multi-barrier layers of the wellbore without requiring any rotation parts. One major advantage of such a geometry is that there are pre-defined spaces between interrogation volumes (target volumes) which results in a reduction of cross-talk between the reflected rays received by detector and thus increases signal-to-noise ratio and therefore ultimately improve detection capability of the apparatus.

Figure 7:
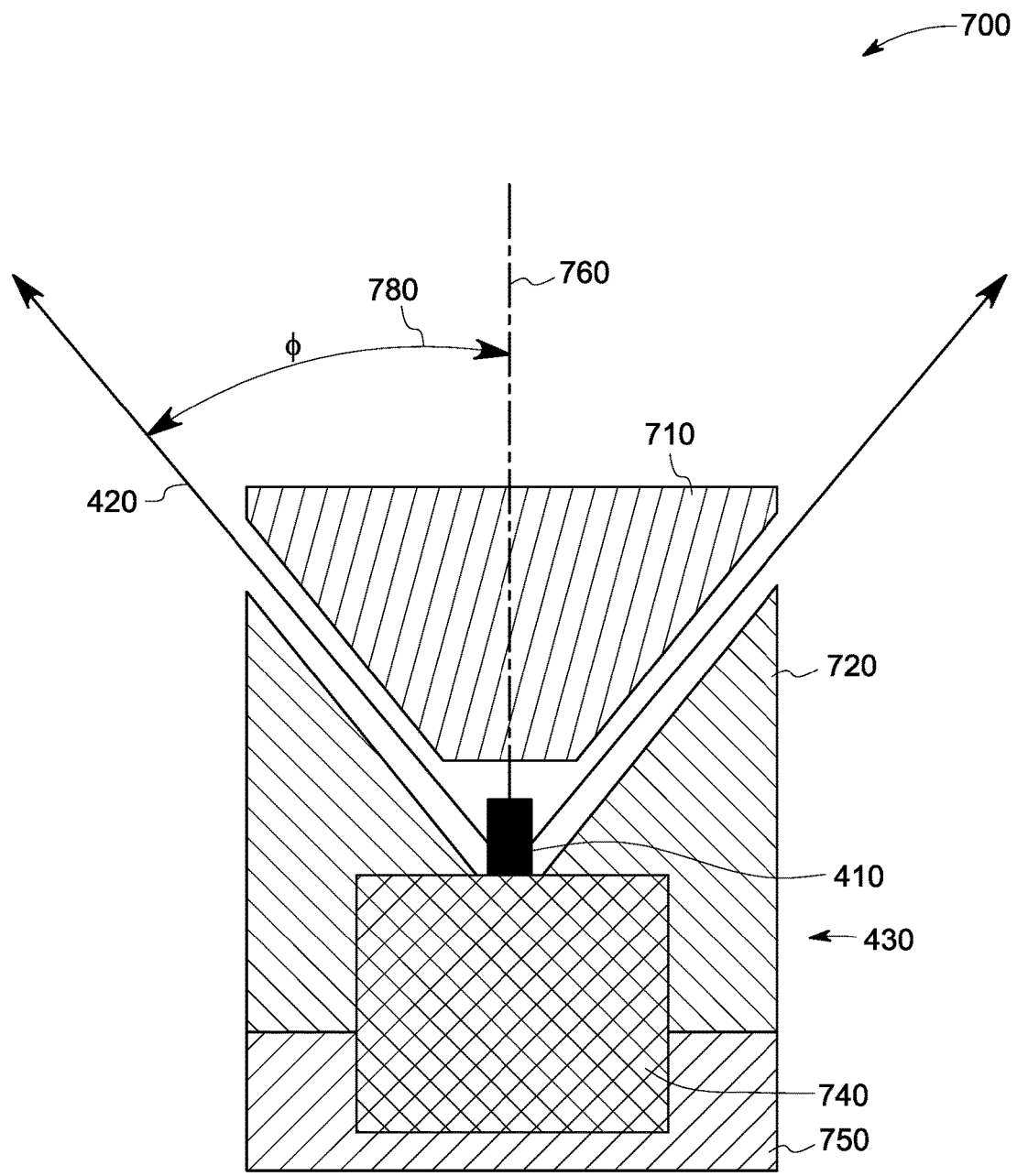
FIG. 7 is a diagrammatic view of an embodiment of apparatus of FIG. 3 showing one example configuration for the source and source collimator.

A source-collimator configuration that enables the collimator field of views as shown in FIG. 6 is shown in FIG. 7, by way of example. The source collimator 430 in the implementation shown in FIG. 7 has a top portion 710 and a bottom portion 720, and is axially aligned with the source 410 which is positioned between the top portion 710 and the bottom portion 720. In accordance with the embodiments described herein, at least one of the top portion 710 or the bottom portion 720 will have alternating blocking channels and passing channels. In at least some implementations, the source 410 and source collimator 430 are supported by additional components such as a source holder 740 and a cap 750.

Another feature that greatly enhances capturing of smaller target volume regions is enabled by offsetting the passing channels (shown by reference numeral 500 in FIG. 4) through which the radiation 420 is projected by an angle phi indicated by numeral 780, with respect to an axis 760 passing through the source 410. This allows the size and position of the passing channels to be designed to optimize performance for certain criteria for example, azimuthal resolution, depth of investigation, depth resolution, logging speed, etc.

Figure 8:
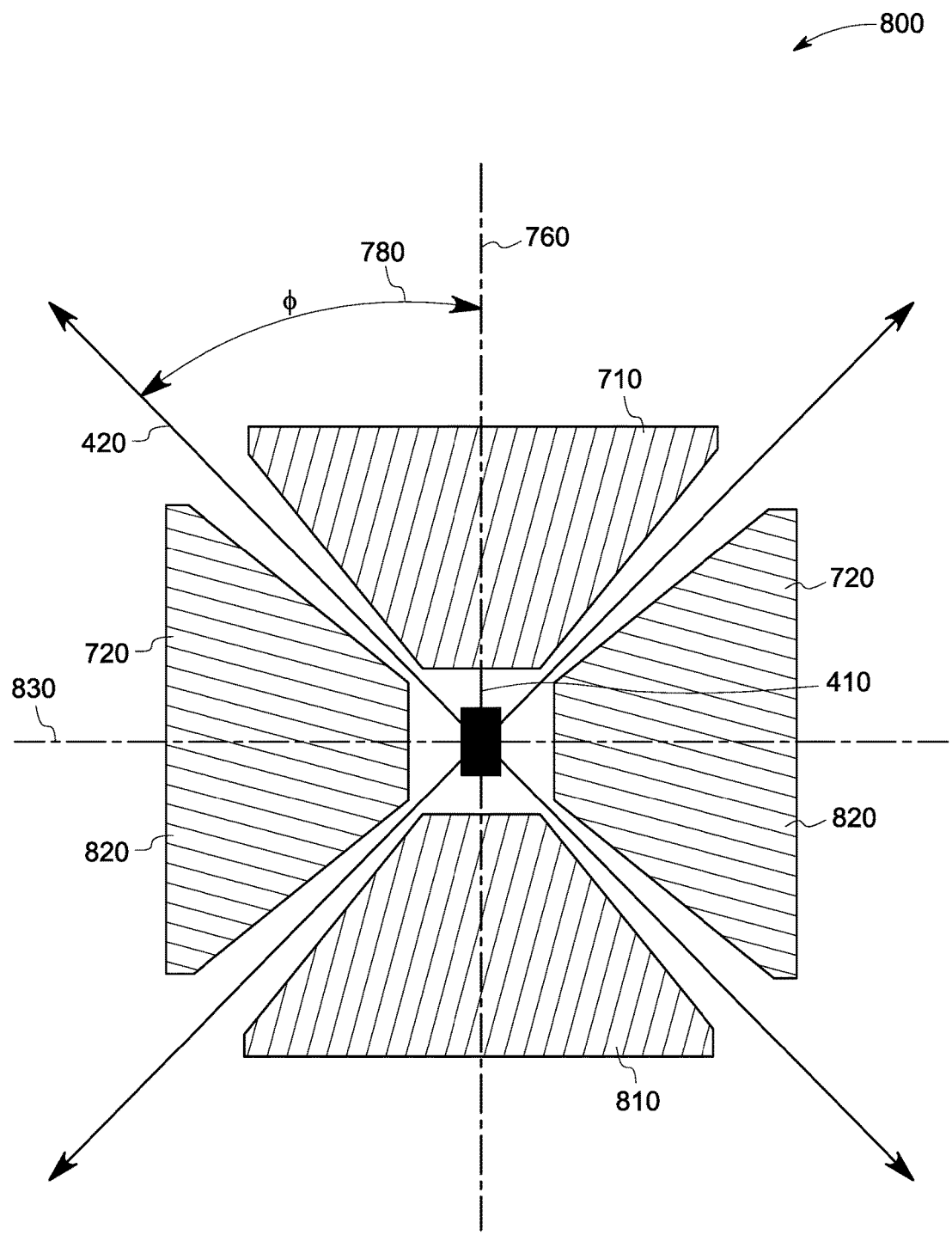
FIG. 8 is a diagrammatic view of another embodiment of apparatus of FIG. 3 showing another example configuration for the source and source collimator configuration.

An alternate configuration that utilizes using multiple source collimators similar to the source collimator shown in the implementation shown in FIG. 7 in a mirrored fashion is shown in FIG. 8. Source collimator portions 710 and 720 are mirrored around an axis 830 by additional source collimator portions are added, shown by 810 and 820. In this configuration a full 360 degrees coverage around the source is achieved.

Figure 10:
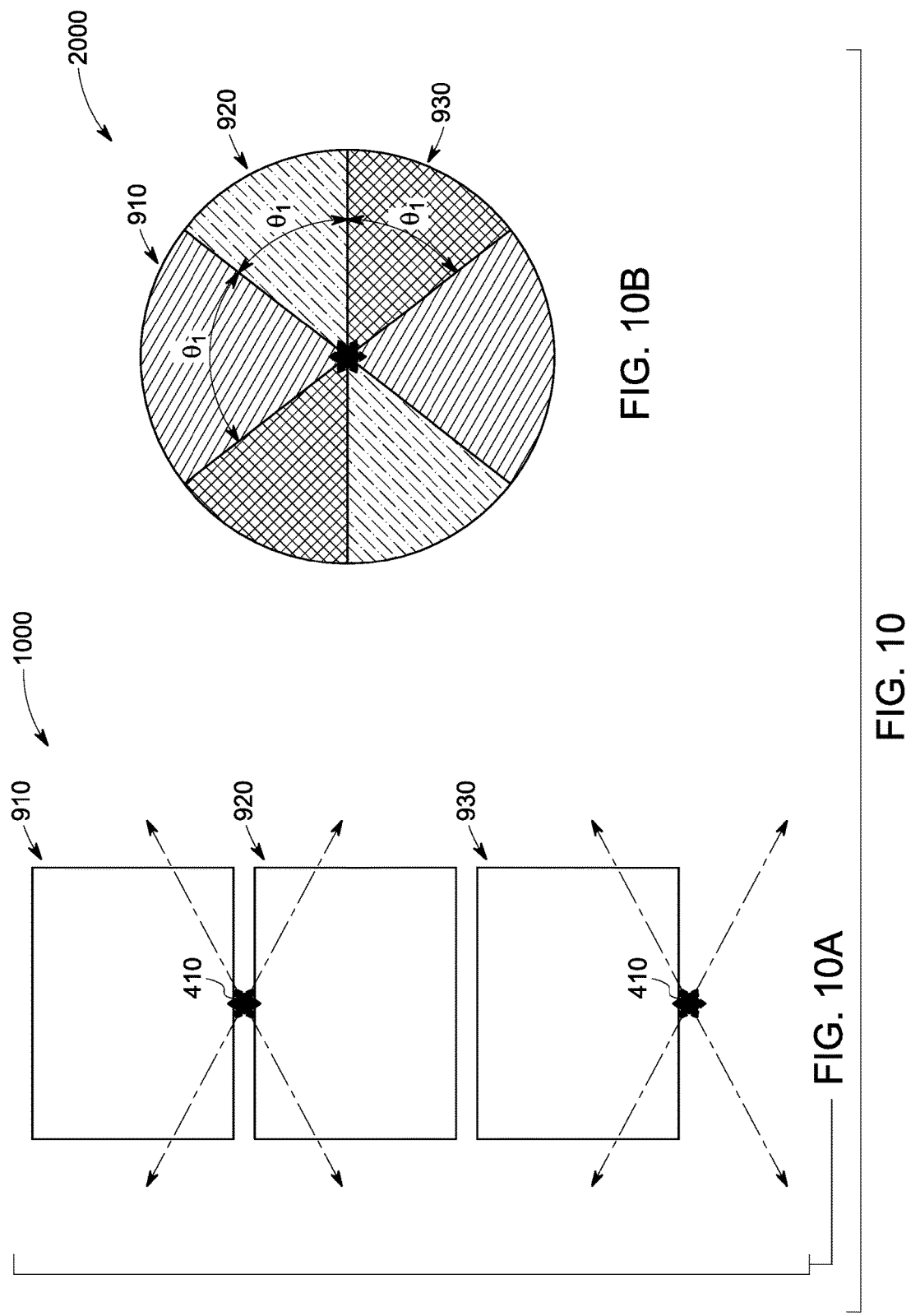
FIG. 10-FIG. 11 are diagrammatic views of different configurations using the arrangement described in FIG. 9.
Figure 11:
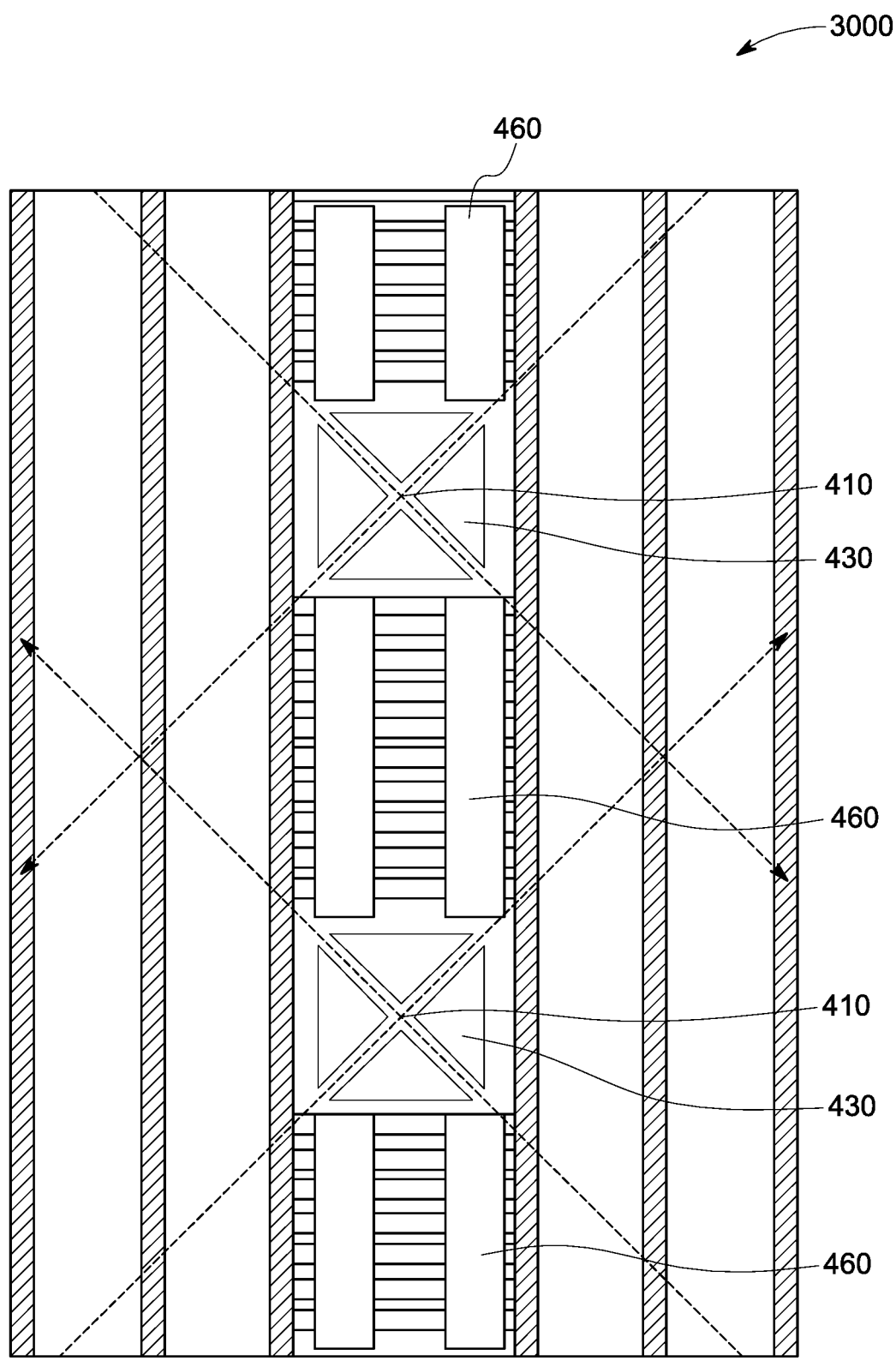

FIGS. 9-11 further explain the multiple source collimator configurations, including the configuration of FIG. 8. It may be noted here that these embodiments make use of the "blank" spaces 640 shown in FIG. 6 that lie between interrogation volumes by using a second source collimator-detector that is a mirror (i.e. substantially similar) of the first one, offset by a second angle to provide a full 360-degree coverage of the wellbore. The second angle is chosen based on application requirements, for example, a smaller second angle enables a better azimuthal resolution, and a larger second angle enables receiving a larger detector signal. FIG. 9 is a diagrammatic representation 900 showing orientations of three source collimators represented by 910 shown in FIG. 9A, 920 shown in FIGS. 920, and 930 shown in FIG. 9C that get integrated into a single assembly for the apparatus for inspecting the defects of the wellbore. FIG. 9A, FIG. 9B, and FIG. 9C show the source collimator field of views 610 having a span defined by the first angle 540, and the blank space 640 defined by the second angle $\theta_2$. In select embodiments, these three source collimators are positioned such that the blank spaces in the arrangement 910 is interrogated by the source collimator field of view of the arrangement in 920, and similarly the blank spaces in the arrangement 920 is interrogated by the source collimator field of view shown in arrangement 930. Thus by using multiple orientations of the source collimators in this manner, the entire 360 degree field of view around the source can be completely inspected as shown in FIG. 10. FIG. 10A shows the axial alignment of the source collimators in the arrangements 910, 920 and 930; and FIG. 10 B shows the effective 360 degree coverage of the entire volume using the source collimator orientations 910, 920, 930. It may be noted here that the source collimator 920 in FIG. 9 and FIG. 10 will be offset by the second angle with respect to the source collimator 910, and similarly, the source collimator 930 will be offset by the second angle with respect to the source collimator 920.

Figure 12:
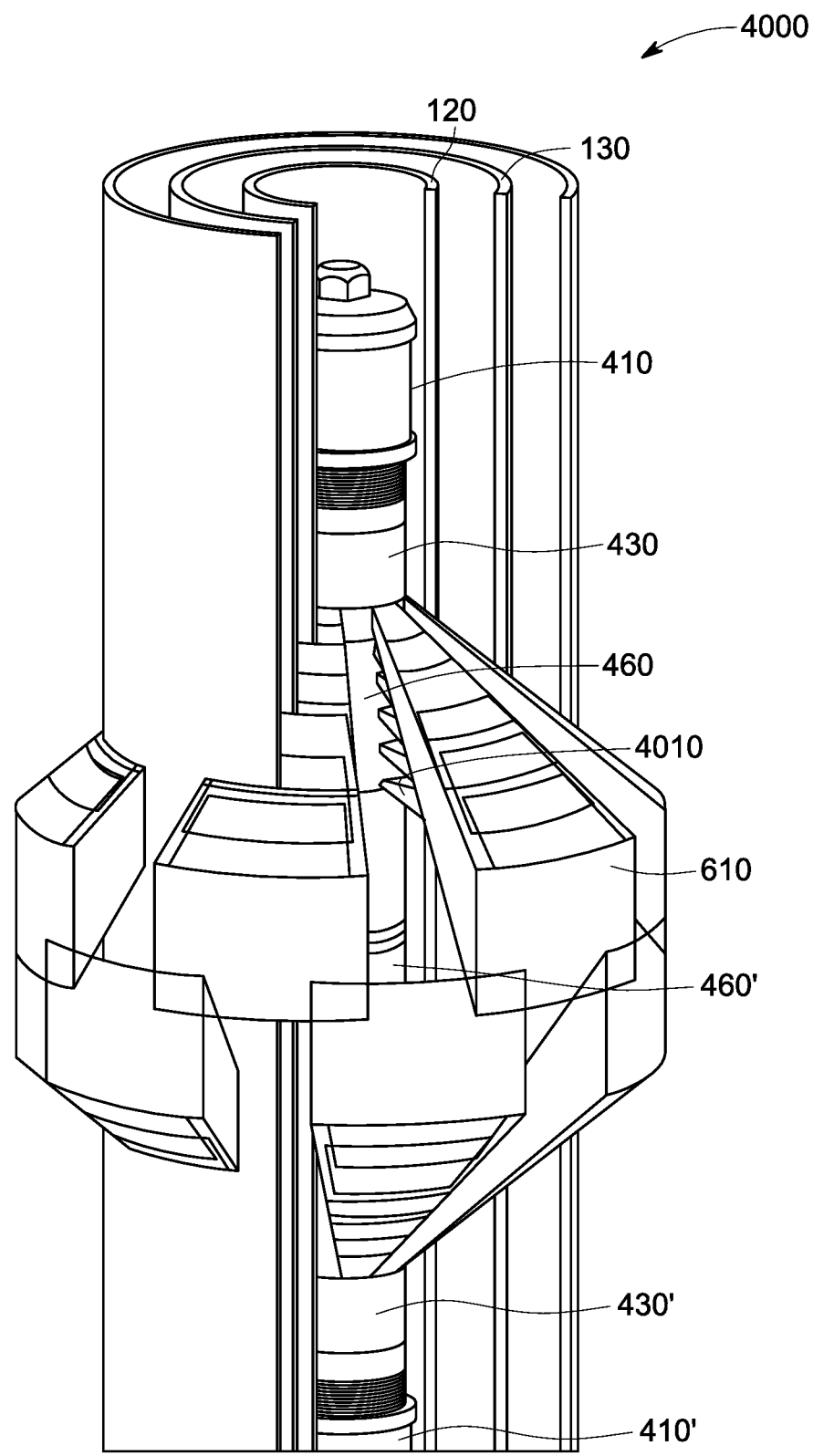
FIG. 12-FIG. 13 are still further examples of different configurations using the arrangement described in FIG. 9 which also show detector field of views.
Figure 13:
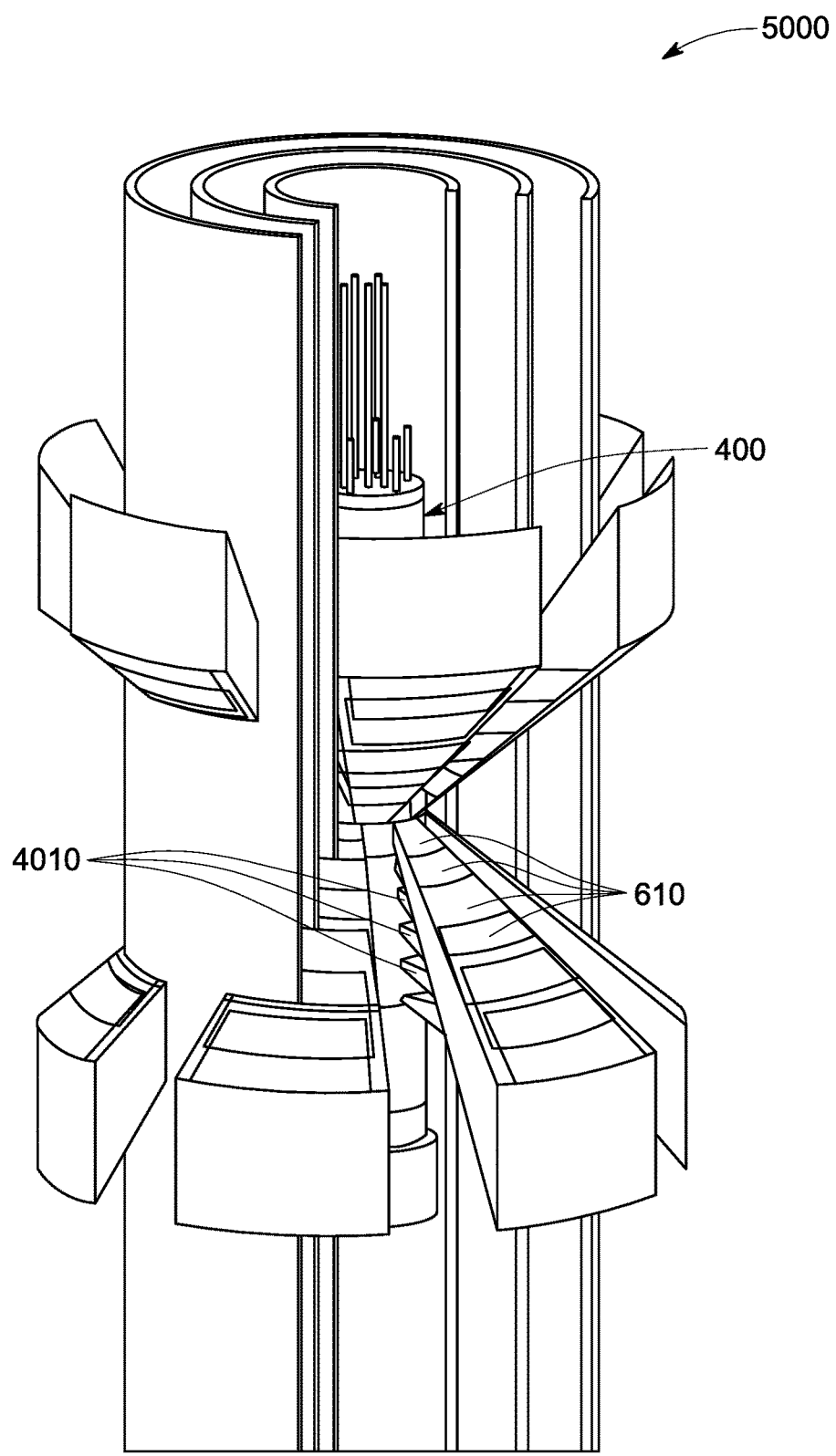
Figure 14:
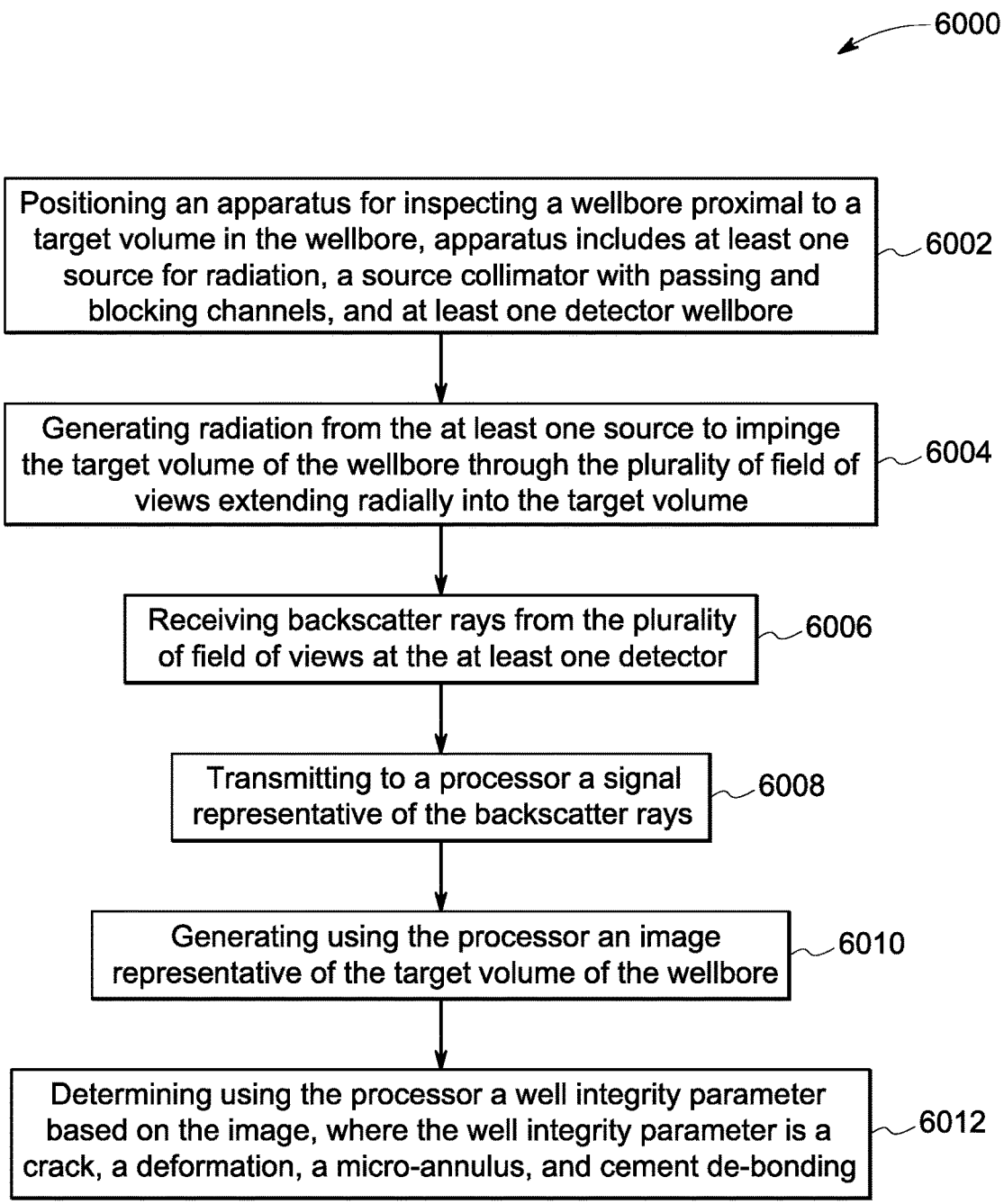
FIG. 14 is a flowchart representation of a method of inspecting the wellbore using the apparatus described in FIG. 3-13.

The above example is further illustrated in FIG. 11 where the configuration 3000 includes sources 410, collimators 430, and detectors 460 that inspect the multiple barriers of the wellbore. FIG. 12 and FIG. 13 show further views of different configurations, by way of example, that are useful for 360 degree coverage of the target volume around the source. It may also be noted here that the detectors used in these configurations will also be aligned in a manner that detector field of views are created for each of the collimator field of views described herein above. This improves the detection depth and accurately captures the backscattered rays from each collimator field of views.

In reference to description herein above, the embodiment 4000 in FIG. 12 shows dual source 410 and 410', dual source collimators 430, 430', and dual detectors 460 and 460'. The source collimator field of views 610 have corresponding detector field of views shown by 4010, and each detector field of view uniquely captures the back-scattered radiation from a respective source collimator field of view.

FIG. 13 is another implementation where there is single source in the apparatus 400 having the source collimator and detectors positioned on either side of the source (similar to a portion of configuration of FIG. 10A). FIG. 13 also shows the source collimator field of views 610 and the corresponding detector field of views 4010 as described herein above.

Thus, the different configurations of the apparatus described herein with the source, collimator, detector combinations, can be arranged for a seamless 360-degree coverage of the wellbore without the need for rotating components, greatly simplifying the construction of the apparatus.

In various embodiments, the source, the source collimator, and the detector as described herein are housed in the inspection probe 230 shown in FIG. 2, that is suspended in the wellbore using a wireline.

Now turning to FIG. 13, a flowchart 6000 illustrates a method of inspecting the wellbore using the apparatus described in FIG. 3-12. The method includes, a step 6002 for positioning the apparatus for inspecting the wellbore proximal to a target volume in the wellbore. Then at step 6004, the method includes generating radiation from the at least one source through a source collimator having a plurality of alternating blocking channels and passing channels to direct radiation to impinge the target volume of the wellbore through the different field of views extending radially into the target volume. At step 6006, the method includes receiving backscatter rays from the plurality of field of views at the at least one detector. The method then includes a step 6008 for transmitting to a processor a signal representative of the backscatter rays; and a step 6010 for generating using the processor an image representative of the target volume of the wellbore. It may be noted here that multiple small target volumes are combined to provide a full 360-degree view of an inspected portion of the well bore.

The method further includes a step 6012 for determining using the processor (and memory), a well integrity parameter (of a defect such as a crack, a deformation, cement de-bonding, or any other) based on the density distribution in image. The determination includes the location and dimension of defects that are indicators of integrity of the well.

It would be understood by those skilled in the art the processor referred herein may include at least one arithmetic logic unit, microprocessor, general purpose controller or other processor arrays to perform computations, and/or retrieve data stored on the memory. In one embodiment, the processor may be a multiple core processor. The processor processes data signals and may include various computing architectures including a complex instruction set computer (CISC) architecture, a reduced instruction set computer (RISC) architecture, or an architecture implementing a combination of instruction sets.

In one embodiment, the memory described herein above may be a non-transitory storage medium. For example, the memory may be a dynamic random access memory (DRAM) device, a static random access memory (SRAM) device, flash memory or other memory devices. The memory may also include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices.

It would be further noted, that in accordance with another embodiment, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a control unit or a controller or processor to perform method discussed herein above. The computer-readable medium may be a non-transitory computer-readable media including all forms and types of memory and all computer-readable media except for a transitory, propagating signal. In one implementation, the non-volatile memory or computer-readable medium may be external memory.

Overall, the different embodiments of the apparatus and method described herein above involve single or multiple sources of radiation, source collimators, and detectors or detector assemblies that are configured for enhanced performance with respect to improved azimuthal resolution, increased logging speed, or enhanced depth resolution. Specifically, the source collimator configuration is quite advantageous with alternating passing channels and blocking channels that allows reduction in cross-talk, since the source output is collimated in the vertical, as well as in the azimuthal direction to selectively excite small volumes of the wellbore structure.

As mentioned herein above, the different embodiments described herein allow inspection of defects in multi-barrier wellbores based on density variation in the images of the inspected volumes. These embodiments can advantageously operate in fluid as well as gas-filled wellbores. Still further advantage includes eliminating a need for rotating parts for inspecting the entire 360-degree scan within the wellbore, and the embodiments described herein provide a more ruggedized and simpler design for harsh environment operation that is present at the varying depths in the wellbore.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An apparatus for inspecting integrity of a multi-barrier wellbore, the apparatus comprising:
   at least one source to generate radiation to impinge a target volume of the wellbore;
   a source collimator having a plurality of alternating blocking channels and passing channels to direct radiation to impinge the target volume, wherein radiation directed from each passing channel forms a plurality of field of views extending radially into the target volume, and wherein each passing channel has an angular width defined by a first angle;
   at least one detector to receive backscatter rays arising from each respective field of view from the plurality of field of views and to generate an image representative of an inspected portion of the wellbore; and
   at least two sources associated with respective source collimators and respective detectors, wherein the source collimators are offset by a second angle with respect to each other, and wherein the at least two sources are aligned axially.

2. The apparatus of claim 1 wherein the target volume is across multiple barriers, wherein the multiple barriers comprise at least a metal layer surrounded by a cement layer.

3. The apparatus of claim 1 wherein the respective detectors are offset by the second angle.

4. The apparatus of claim 1 further comprising at least two source collimators associated with respective detectors, wherein the two source collimators are offset by the second angle with respect to each other, and wherein the at least one source is between the at least two source collimators and the respective detectors.

5. The apparatus of claim 4 wherein the respective detectors are offset by the second angle.

6. The apparatus of claim 1 wherein each passing channel is offset by an angle phi with respect to an axis passing through at least one source, and wherein the at least one source and the source collimator are axially aligned.

7. The apparatus of claim 1 wherein the inspected portion of the wellbore is a full circular portion of the wellbore around the at least one source.

8. The apparatus of claim 1 wherein the source collimator comprises a top portion and a bottom portion, wherein the at least one source is positioned between the top portion and the bottom portion.

9. The apparatus of claim 8 wherein at least one of the top portion or the bottom portion comprises the plurality of alternating blocking channels and passing channels.

10. The apparatus of claim 1 wherein the at least one source, the source collimator, and the at least one detector are housed in an inspection probe.

11. The apparatus of claim 1 wherein the radiation is at least one of X-ray radiation or Gamma radiation.

12. The apparatus of claim 1 further comprising a processor configured to receive a signal representative of the backscattered rays from the detector and configured to generate the image representative of the inspected portion of the wellbore, and further configured to determine a well integrity parameter based on density distribution in the image.

13. The apparatus of claim 12 wherein the well integrity parameter is representative of at least one of a void, crack, a deformation, a micro-annulus, or a cement de-bonding.

14. A method of inspecting a wellbore, the method comprising:
    positioning an apparatus for inspecting the wellbore proximal to a target volume in the wellbore, wherein the apparatus comprises:
    at least one source to generate radiation to impinge the target volume of the wellbore, a source collimator having a plurality of alternating blocking channels and passing channels to direct radiation to impinge the target volume, wherein radiation directed from each passing channel forms a plurality of field of views extending radially into the target volume, and wherein each passing channel has an angular width defined by a first angle, at least one detector to receive backscatter rays arising from each respective field of view from the plurality of field of views, and at least two sources associated with respective source collimators and respective detectors, wherein the source collimators are offset by a second angle with respect to each other, and wherein the at least two sources are aligned axially;
    generating radiation from the at least one source to impinge the target volume of the wellbore through the plurality of field of views extending radially into the target volume;
    receiving backscatter rays from the plurality of field of views at the at least one detector;
    transmitting to a processor a signal representative of the backscatter rays; and
    generating using the processor an image representative of the target volume of the wellbore.

15. The method of claim 14 further comprising determining using the processor a well integrity parameter based on the image.

16. The method of claim 15 wherein the well integrity parameter is representative of at least one of a crack, a deformation, cement de-bonding, or other type of annulus or casing defects.

17. The method of claim 16 wherein the target volume sweeps a full circle around the at least one source.

* * * * *